United States Patent

McNulty

[11] Patent Number: 5,868,425
[45] Date of Patent: Feb. 9, 1999

[54] AUTOMOBILE BODY WORK COVER

[76] Inventor: Kevin P. McNulty, 5216 Third Ave., Altoona, Pa. 16602

[21] Appl. No.: 409,835

[22] Filed: Mar. 27, 1995

[51] Int. Cl.$^6$ .............................. B60R 19/00; B60J 11/00
[52] U.S. Cl. ............................................ 280/770; 150/166
[58] Field of Search ..................................... 280/762, 770, 280/850; 293/128; 296/136, 77.1; 150/166, 167, 168

[56] References Cited

U.S. PATENT DOCUMENTS

| | | | |
|---|---|---|---|
| 2,979,190 | 4/1961 | Daigle ..................................... | 280/850 |
| 3,147,176 | 9/1964 | Haslam ................................... | 293/128 |
| 4,842,324 | 6/1989 | Carden .................................... | 296/136 |
| 4,849,272 | 7/1989 | Haney et al. . | |
| 4,884,824 | 12/1989 | Radke . | |
| 4,896,911 | 1/1990 | Duke ...................................... | 293/128 |
| 4,925,234 | 5/1990 | Park et al. . | |
| 5,129,678 | 7/1992 | Gurbacki . | |
| 5,129,695 | 7/1992 | Norman, II ............................. | 293/128 |
| 5,195,778 | 3/1993 | Dismuke . | |
| 5,244,245 | 9/1993 | Kashino . | |
| 5,290,618 | 3/1994 | Olson et al. . | |
| 5,364,156 | 11/1994 | Zerow .................................... | 296/136 |

FOREIGN PATENT DOCUMENTS 928869   6/1963   United Kingdom ................... 296/136

OTHER PUBLICATIONS

MAC Tool catalogue, p. 247, date unknown, place of publication unknown.

Carquest catalogue, page unknown, date approximately Oct. 31, 1994, place of publication unknown.

NAPA catalogue, p. 143, date unknown, place of publication unknown.

*Primary Examiner*—J. J. Swann
*Assistant Examiner*—Frank Vanaman
*Attorney, Agent, or Firm*—Kirkpatrick & Lockhart LLP

[57] ABSTRACT

An automobile work cover which has a body made of a sheet-like, tough material and which has at least one substantially straight edge. The body has a tough, fluid-resistant outer surface and a soft, non-scratching inner surface, and is sized to cover a sufficient amount of an automobile fender or the like to protect the fender from being scratched during under-hood repair. A flexible weighted portion is attached to the substantially straight edge for retaining the cover in position on the automobile fender. The weighted portion includes a loop formed in the edge of the body by folding the edge back and attaching the edge to the inner surface. Flexible padding material and a number of weights are wrapped in the padding material within the loop.

3 Claims, 5 Drawing Sheets

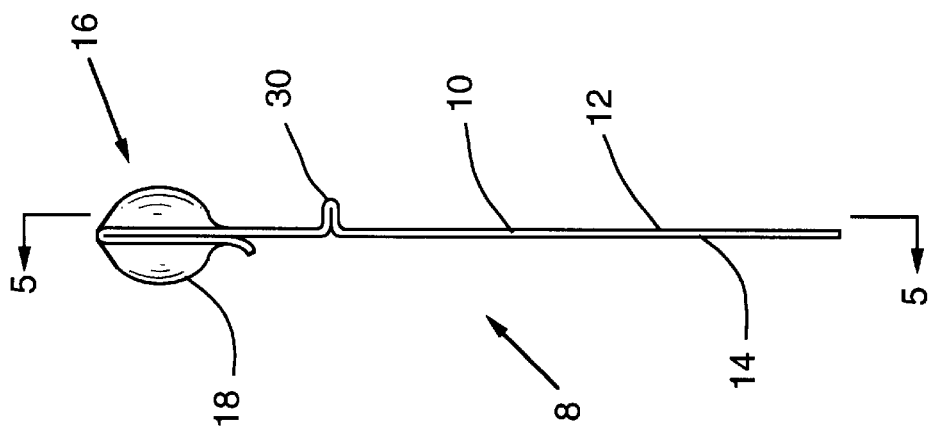
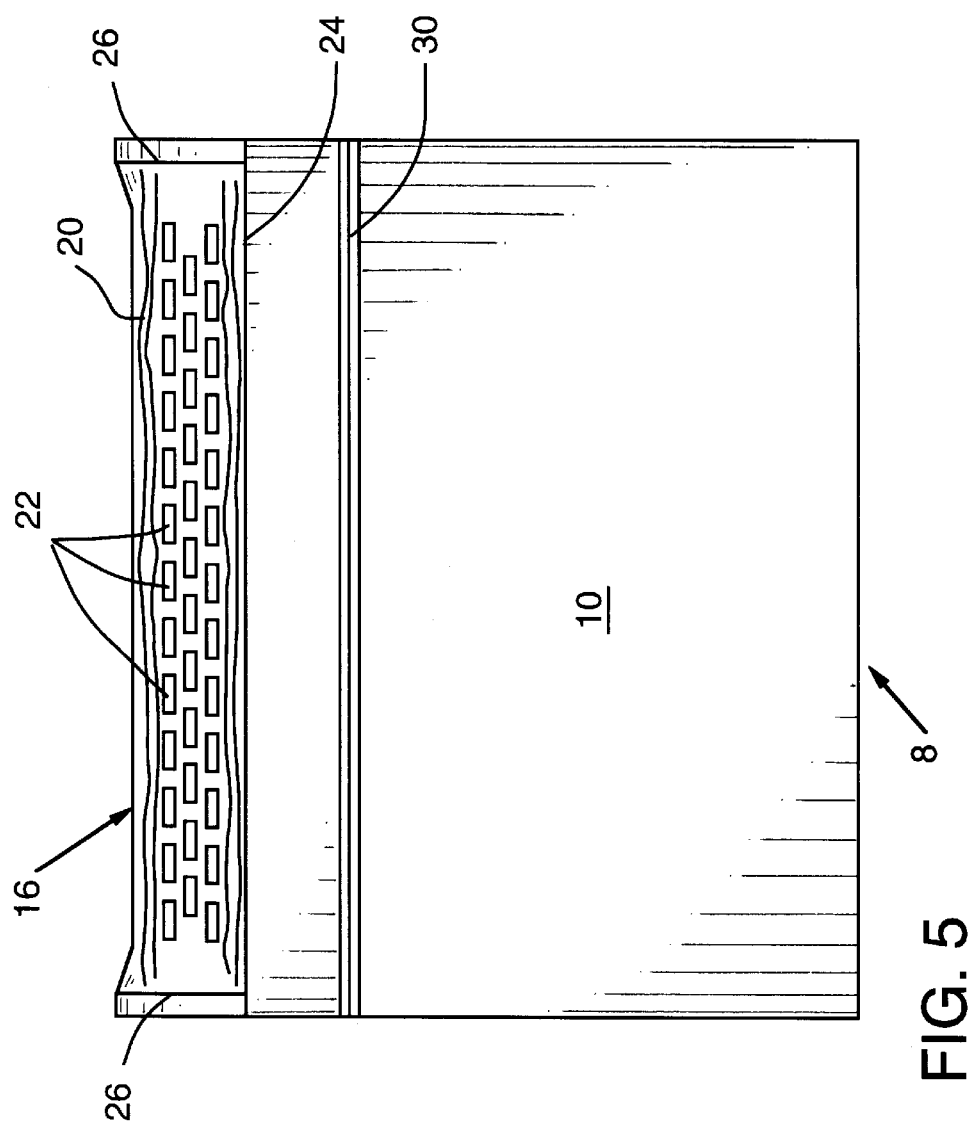

AUTOMOBILE BODY WORK COVER

BACKGROUND OF THE INVENTION

FIELD OF THE INVENTION

This invention relates to automobile protective covers. More particularly, this invention relates to automobile body work covers which are placed on the fender of an automobile while a mechanic works on the engine of the automobile.

DESCRIPTION OF THE INVENTION BACKGROUND

When a typical automobile is in the shop for repairs to the engine or some other part that is under the hood, it is necessary for the automobile mechanic to work under the hood by leaning into the engine compartment over the fenders or the front grill. The inside of a typical engine compartment is extremely dirty. Grease, oil, fuel, solvents, fluids, and exhaust fumes from the internal combustion engine operating inside the engine compartment are present, as well as many other forms of dirt and grime from the road that enter the compartment through the grill and through the open bottom. The mechanic typically becomes extremely dirty as he works on the engine under the hood, not merely his hands, but his arms, torso, head and face, and even legs and back. The mechanic will get additionally dirty from working under the car.

The automobile's fender, part of the exterior of the car, is designed and maintained to have an attractive appearance. While work is being performed under the hood, the finish of the automobile fender is in danger of becoming dirty, nicked and scraped, and the fender material susceptible to dents and scratches. The dirt and grime from the engine compartment and from the mechanic will easily be transferred to the fender. Equally as dangerous are belt buckles, buttons, zippers, and jewelry on the body of the mechanic himself and tools, parts, solvents and other items which may easily be dropped or laid upon or otherwise come in contact with the finish.

To protect the fender from these perils, a fender cover is usually placed over the fender of the automobile while the mechanic works under the hood. A fender cover is typically an approximately 27" by 36" rectangular piece of heavy material, sizable enough to cover a substantial portion of the fender on one side of the car. The fender cover is attached at the top in or near the engine compartment and hangs down over the fender. Typically, the cover is constructed of a heavy duty, puncture-resistant, non-absorbent outer surface, such as vinyl or Leatherette™, and has a non-skid backing, such as foam or rubber. Some covers have nylon backing.

Prior art fender covers attach to the fender in a number of ways. A common method of retaining a fender cover is by placing enough of the cover into the engine compartment so that the weight of the amount of the cover within the engine compartment offsets the weight of the portion hanging down. These types of covers may have a non-skid backing to increase the co-efficient of friction between the cover and the fender surface, which further aids in preventing the fender from slipping off.

A disadvantage of this type of fender cover is that the cover must extend into the engine compartment a substantial amount. The portion of the fender cover that extends into the engine compartment must cover a portion of the work area in the engine compartment, thus inhibiting the mechanic's freedom of movement and ease of working. The portion extending into the engine compartment may interfere with the moving parts in the engine compartment, such as fans, belts, and pulleys, causing great inconvenience and a safety hazard. Also, the portion extending into the engine compartment quickly becomes dirty, attracting dirt and debris from within the compartment, both on the inner side and the outer side. Such debris will then be transferred to the fender upon removal of the cover. In addition, the dirt and particles that are trapped between the fender and the cover can scratch the car's finish. Furthermore, with such a large area of the cover retaining dirt from the engine compartment, the entire cover, both inside and outside, quickly becomes dirty when the fender cover is removed and folded.

Furthermore, fender covers are used repeatedly on different makes and models of cars, and dirt and particles over the entire cover will be transferred from car to car. This will occur even if the cover is not folded. Because different makes and models have different size and shape fenders, the amount of the cover that extends into the engine compartment will differ from car to car. Therefore, a portion of the fender cover which extended into the engine compartment on one car may rest partially on the fender of another car. Thus, dirt and debris that is stuck on the fender cover will be transferred to the fenders of other cars. In addition, fender covers are often carelessly dragged, across the car's finish when placed and removed, thus transferring additional dirt and debris to the fender.

To combat this problem, fender covers have been designed to attach at the edge of the engine compartment. Various means have been designed to allow such attachment. One means of attachment has been to attach magnets to the cover, typically by sewing the magnets into a folded lining at the top edge of the cover, or by sewing the magnets into the cover at strategic points. For example, U.S. Pat. No. 4,884,824 to Radke and U.S. Pat. No. 4,849,272 to Haney et al. show fender covers which are securable by the use of magnets sewn or otherwise attached to the cover. However, a disadvantage of magnetic fender covers is that they can work only on metal fenders. Automobiles are increasingly being made with fenders made of materials other than metal, such as fiberglass, plastic and composites. Magnetic fender covers will not work on such fenders. Another disadvantage of magnetic fender covers is that the magnets themselves attract metal debris from the engine compartment or the shop area. This metal debris may be transferred directly to the fender of the next car that the cover is placed upon. Thus, bits of metal may become trapped between the magnet in the fender cover and the fender itself, causing the finish to become scratched or marred.

Another means designed to attach fender covers at the edge of the engine compartment is to attach hooks or fasteners to the top edge of the cover for connecting to edges, holes, braces or other catches found within the engine compartment. For example, U.S. Pat. No. 5,290,618 to Olson et al. and U.S. Pat. No. 5,195,778 to Dismuke show fender covers that utilize hooks to retain the cover in place. A disadvantage of this type of fender cover is that different makes and models of automobiles have differently configured engine compartments, with the various edges, holes, braces and other catches placed in different locations. Therefore, a fender cover utilizing hooks may not always fit properly, and cannot always be precisely positioned, because there may not be sufficient catch mechanisms available at the appropriate locations. If the catch mechanisms are too far apart, then the cover cannot be attached. If the hooking mechanisms are too closely spaced, then the cover will have slack in it. Thus, different amounts of such covers will extend into the engine compartments of different cars. Olson discloses hooks attached to a stretchable cable. However, the cover in Olson may sag or shift depending on the distance between the available catches. A further disadvantage of the use of hooks is that the hooks themselves may come into contact with the fender when placing or removing the cover, and thus scratch or mar the finish. Furthermore, properly securing such hooks can be inconvenient.

In view of the above, it is an object of this invention to provide a fender cover which does not extend into the engine compartment of the automobile.

It is a further object of this invention to provide a fender cover which will work on fenders made of any material.

It is a further object of this invention to provide a fender cover which does not require any holes, edges, braces or other catches to be secured.

It is a further object of this invention to provide a fender cover which does not attach using magnets or hooks.

It is an advantage of this invention that the fender cover is more convenient to position and secure than prior art fender covers.

It is a further advantage of this invention that the fender cover molds or forms to the contour of a fender or to irregularly-shaped surfaces and will remain secure thereon.

It is a further advantage of this invention that the fender cover additionally provides a padded or cushioned edge upon which the mechanic can comfortably rest his arms while working within the engine compartment.

SUMMARY OF THE INVENTION

The present invention is an automobile body work cover which has a body made of a sheet-like, tough material and which has at least one substantially straight edge. The body has a tough, fluid-resistant outer surface and a soft, non-scratching inner surface, and is sized to cover a sufficient amount of an automobile fender or the like to protect the fender from being scratched during under-hood repair. A flexible weighted portion is attached to the substantially straight edge for retaining the cover in position on the automobile fender. The weighted portion includes a loop formed in the edge of the body by folding the edge back and attaching the edge to the inner surface. Flexible padding material and a number of weights are wrapped in the padding material within the loop.

BRIEF DESCRIPTION OF THE DRAWINGS

The preferred embodiment of the present invention will be described in greater detail with reference to the accompanying drawings, wherein like members bear like reference numerals and wherein:

FIG. 4 is an elevational view of one end of the fender cover;

FIG. 5 is an elevational view of the outer side of the fender cover, with a cross-sectional view of the weighted portion taken on line 5—5 of FIG. 4.

DESCRIPTION OF A PREFERRED EMBODIMENT

Figure 1:
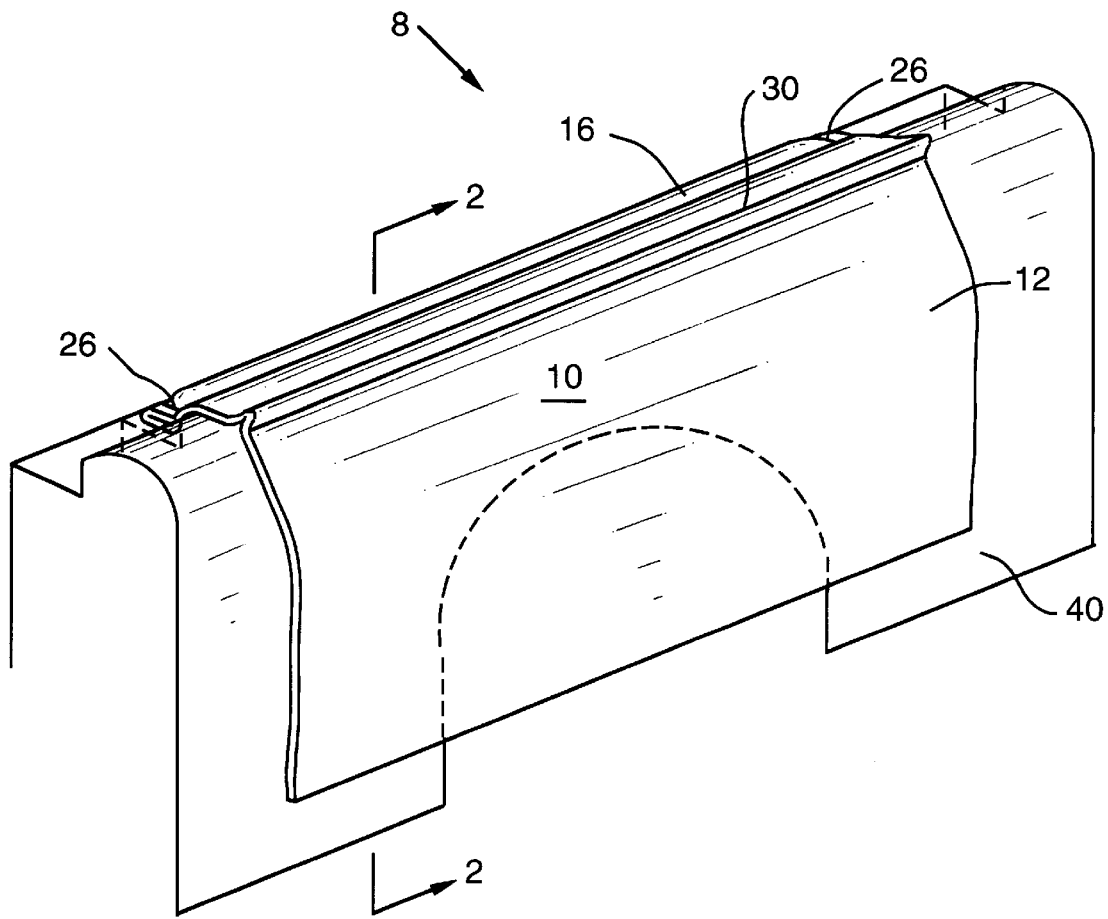
FIG. 1 is a perspective view of the fender cover of the present invention in operating position on a typical automobile fender.
Figure 2:
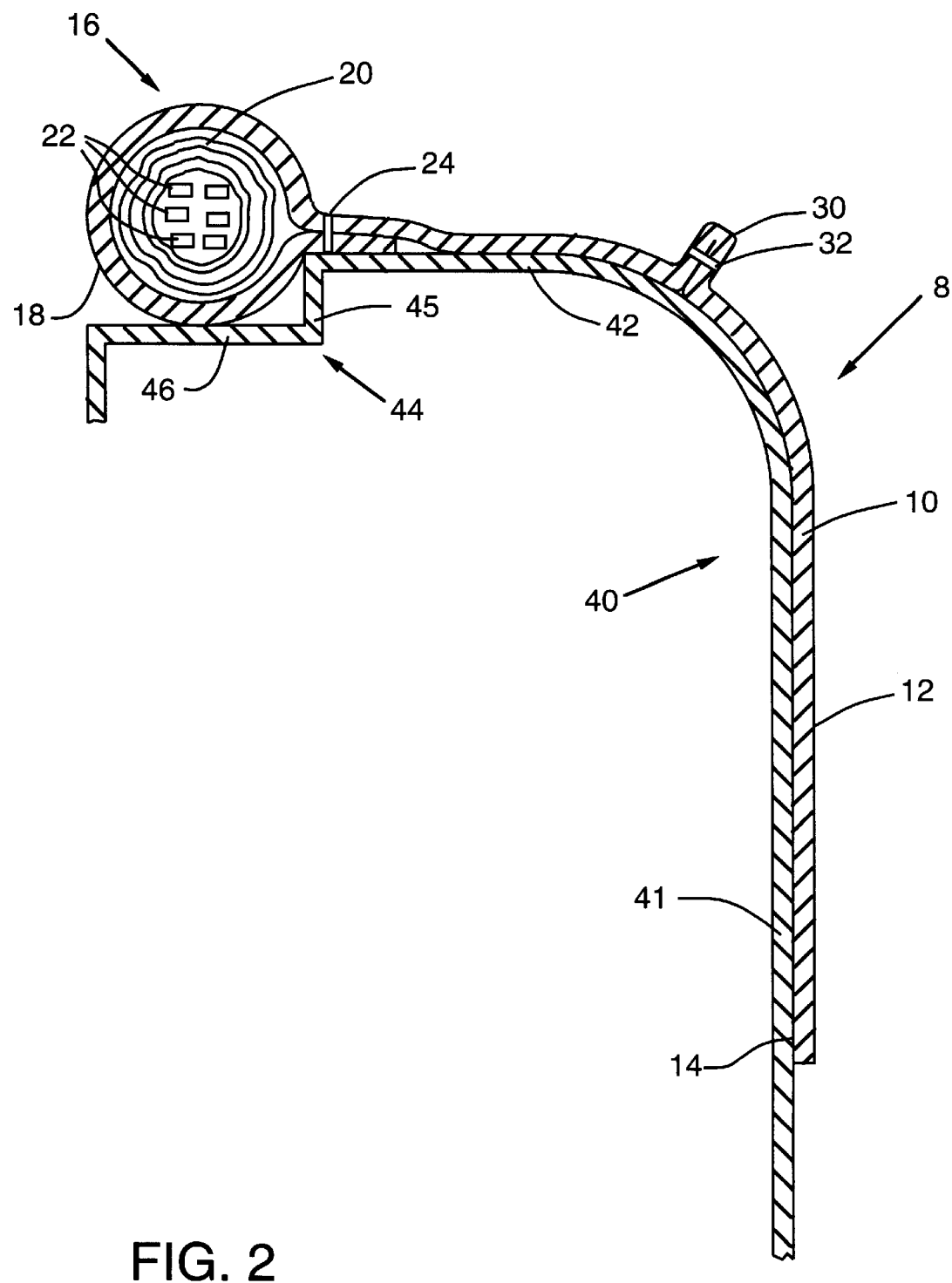
FIG. 2 is a vertical sectional view of the fender cover and fender taken on line 2—2 of FIG. 1.

Referring to FIGS. 1 and 2, an embodiment of the present invention is shown. An automobile body work cover 8 has a body 10 which has an outer surface 12 and an inner surface 14. The cover 8 is formed from a piece of sheet-like material of sufficient surface area to cover a sizable portion of the fender 40 on one side of a car, preferably approximately 22 inches (56.41 cm) by 36 inches (92.31 cm). The cover 8 may be formed of any surface area desired that adequately covers the surface to be protected. Outer surface 12 is a tough, heavy duty, puncture-resistent, non-absorbent flexible material such as vinyl, Leatherette™ or Naugahyde™, which will resist grease, oil, fluids, solvents and other automotive liquids. The inner surface 14 is a soft material that is kind to automotive finishes and dirt-resistant. The body 10 may be as thin as is possible using known materials which have these properties for the outer surface 12 and the inner surface 14, and may be as thick as may be desired to heighten the protective ability of the cover 8.

A weighted portion 16 is formed in the upper edge of the body 10. The weighted portion 16 is formed with reference to FIGS. 2–5. A plurality of lead weights 22, each approximately 1 inch (2.56 cm)×¼ inch (0.64 cm) in size, preferably about 2½ to 3 pounds (1.14 to 1.35 kg) worth, are evenly distributed in a line, and are rolled up inside a sheet of batting or other soft, durable padding material 20 to form an approximately 4½ inch (11.52 cm) diameter roll. The roll may be secured with a few pieces of tape (not shown), such as duct tape, attached at the ends and the middle, or with a few stitches (not shown) at the ends and the middle. A loop 18 holding the weights 22 and padding material 20 is formed integral to the cover 8 by folding the upper edge of the body 10, with the outer surface 12 facing out, around the padding material 20 with the lead weights 22 therein, squeezing the padding material 20 down to an approximately 2 to 2½ inch (5.12 to 6.4 cm) diameter roll, until the upper edge meets the inner surface 14. Approximately ¼ to ½ inch (0.64 to 1.28 cm) of the upper edge is held against the inner surface 14 and is sewn to the inner surface 14 along the entire length of the edge along stitch line 24. Stitches 26 are sewn approximately ¼ to ½ inch (0.64 to 1.28 cm) from each end of the loop 18. Nylon thread is preferred for the stitches 24 and 26 for strength and durability.

This preferred combination of weights 22 and padding material 20 to form the weighted portion 16 provides a firm yet flexible anchoring device for the cover 8, and also serves as an excellent padded rest for tired arms, elbows, and stomachs leaning over fenders for hours on end. This preferred combination of size, shape and weight of lead weights 22 and thickness of padding material 20 works to secure the cover for every application. The weighted portion 16 retains enough flexibility to mold or form to the contour of virtually any shape fender. The preferred total weight of the lead weights 22 has been calculated given the size and weight of the preferred material for the body 10 of the cover 8. Reducing the amount of weight will decrease the stability of the cover 8, and increasing the total weight will increase the stability of the cover 8. If the total weight of the lead weights 22 is increased, it is preferred that the padding material 20 be increased as well, to maintain the proper flexibility and padding. However, to increase the weight and the padding too much can cause the cover 8 as a whole to become heavier, thus decreasing the ease and comfort of handling the cover 8, and can cause the weighted portion 16 to become larger, thus interfering with the mechanic's activities. As the size of the body 10 of the cover 8 increases, and/or a heavier material is used, so must the total weight of the weighted portion 16 be increased. Likewise, as the size of the body 10 of the cover 8 decreases, and/or a lighter material is used, the total weight of the weighted portion 16 may be decreased. In addition, the inner side 14 can be formed of a material that is non-skid as well as gentle to the fender finish. The use of a non-skid material on the inner side 14 of the cover 8 will allow a decrease in the lead weights 22 or an increase in the weight of the cover 8 and still retain the stability of the cover 8. However, with the incorporation of the weighted portion 16 into the cover 8, a non-skid inner surface 14 is not necessary, therefore a smoother, more dirt-resistant material may be used.

The weights 22 may be formed of materials other than lead. Similarly, the padding material 20 may be formed of any material, including without limitation foam rubber or the like that could be formed to retain the proper shape, flexibility and padding characteristics. The size and material of the weights 22 and the amount and material of the padding material 20 may, of course, be varied to adjust the overall flexibility and comfort of the weighted portion 16. The weights 22 should not be so large as to interfere with the flexibility of the weighted portion 16. I prefer not to construct the weight 22 of sand or of material that is as small as approximately ¼ inch (0.64 cm) across, and not to use round weights, like BB's or marbles. If sand is used or the weights 22 are too small, they could be a safety hazard, cause damage, or be difficult to clean up should the weighted portion 16 break open. If the weighted portion 16 broke open, sand or small pellets would scatter and may fall into the engine compartment or other portions of the car, or into machinery or tools, or into the shop area and floor. Sand or small pellets could interfere drastically with the operation of moving parts of the vehicle and machinery, causing substantial damage and a substantial safety risk. Furthermore, sand or small pellets on the shop floor also may be a safety hazard. Although the weighted portion 16 should be of high quality construction to minimize the possibility of breakage, such probability cannot be completely eliminated, especially in an automotive shop where the collection of heavy objects, power tools or machinery, corrosive solvents and heavy usage create a rough environment for the cover 8.

Returning to FIGS. 1 and 2, an additional ridge 30 may be sewn into the body 10 of the cover 8. The ridge 30 is preferably approximately ¼ inch (0.64 cm) high and approximately 2¾ inches (7.04 cm) from the weighted portion 16. The ridge 30 is formed by pinching or doubling together a small portion of the body 10 of the cover 8 parallel to the weighted portion 16 and sewing the pinched portion together along stitch line 32, preferably with nylon thread. The ridge 30 can be used to keep small parts and tools resting on the cover 8 and prevent such items from rolling or falling off the cover 8. The ridge 30 can also add some extra stability to the cover 8 in certain applications.

FIGS. 1 and 2 show the cover 8 in use on a typical automobile fender 40. The typical fender 40 comprises a substantially vertical portion 41 and a substantially horizontal portion 42, although on some later model cars the substantially horizontal portion 42 may be small or nonexistent. The fender 40 has a lip 44 formed in conjunction with the horizontal portion 42 by a small vertical lip portion 45 and a small horizontal lip portion 46. The lip 44 typically is formed in the fender 40 to provide a space to attach the fender 40 that is hidden from view and from the elements when the hood is closed. The lip 44 is also formed so that when the hood is closed the surface of the hood is flush with and creates a continuous aerodynamic line with the fender 40.

When the hood is raised, lip 44 creates a convenient aid to securing the cover 8. The weighted portion 16 can be placed over the lip onto the horizontal lip portion 46. In this configuration, if a substantial force pulls the fender cover body 10 downward or outward, the weighted portion 16 will catch on vertical lip portion 45 and help retain the cover 8 on fender 40.

Figure 3:
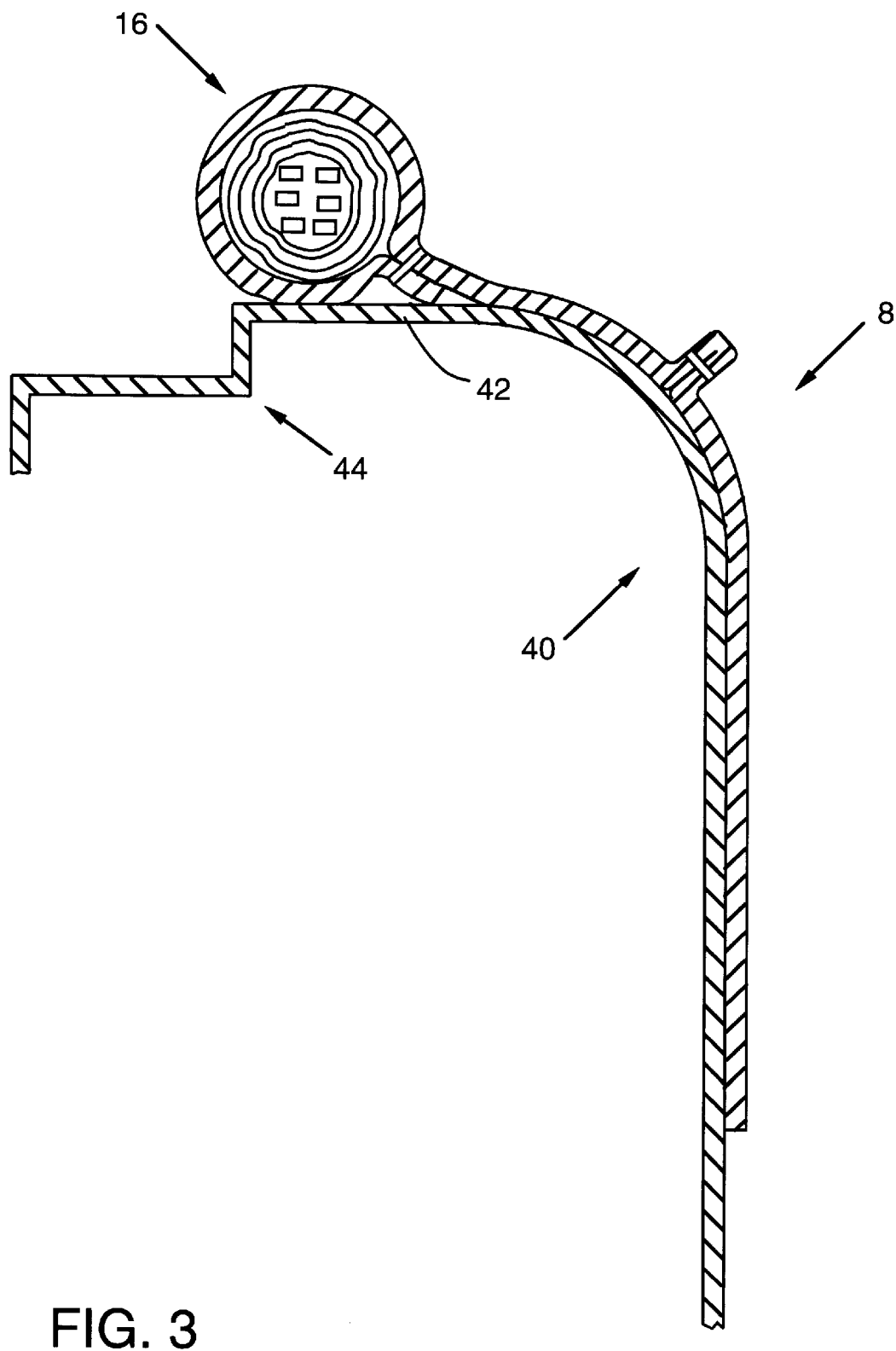
FIG. 3 is a vertical sectional view of the fender cover and fender in an alternate configuration.

As shown in FIG. 3, the lip 44 on the fender 40 is not necessary to utilize the invention. The cover 8 will remain secure by placing the weighted portion 16 on the horizontal fender portion 42. The mechanic may desire to do this for a variety of reasons. Perhaps the mechanic does not want any portion of the cover 8, including the weighted portion 16, to be placed in the area that is under the hood. The mechanic may need to actually work on the area around the lip 44, or perhaps the car may have no such lip.

Figure 6:
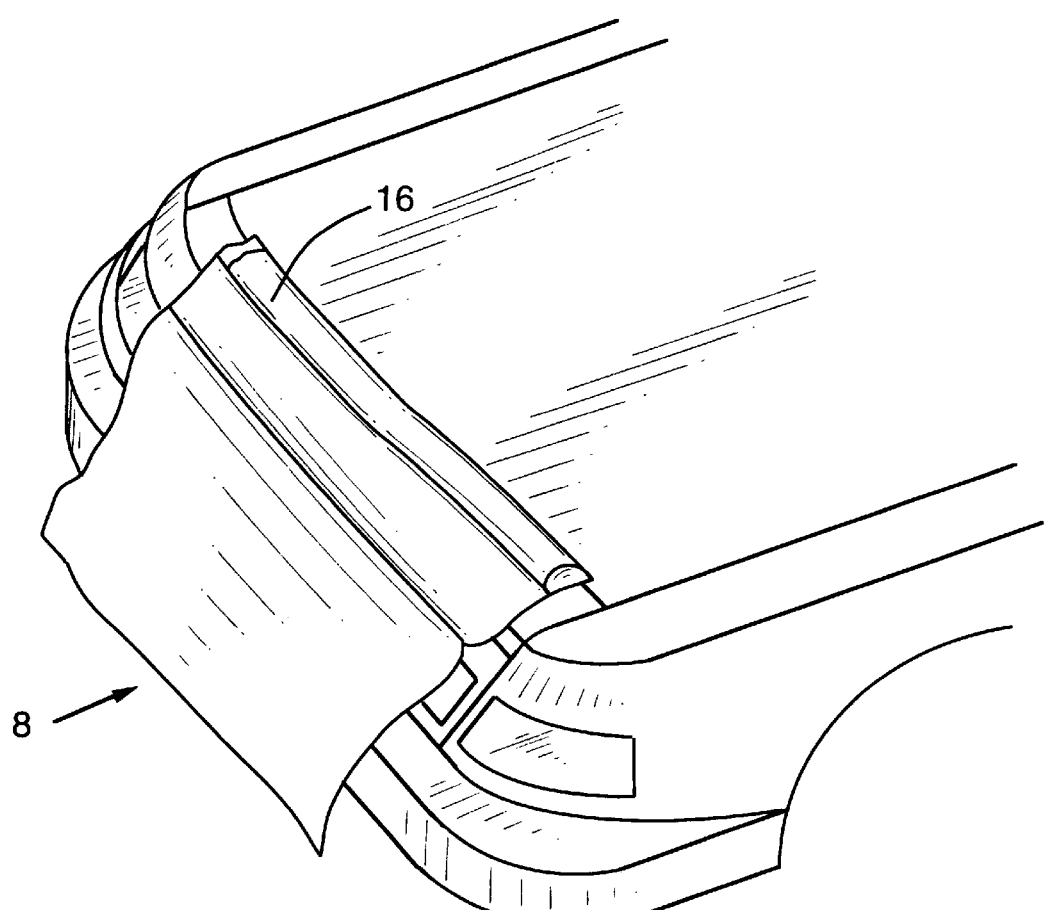
FIG. 6 is a perspective view of the fender cover of the present invention in operating position on a typical automobile front grill.

FIG. 6 shows how the cover 8 of the present invention may be used to protect the front grill and bumper of the car when the mechanic is working under the hood. The typical engine compartment may not have a clear flat space the width of the cover 8, but rather will have a variety of braces and other surfaces. The cover 8 will easily stay secured in such an environment, because the flexibility of the weighted portion 16 will allow the cover to mold to the surfaces that are present. The weight of the weighted portion 16 will still operate to secure the cover 8 without slippage.

The cover 8 is useful in many applications for working on portions of a car other than under the hood. The cover 8 may be used to protect the rear panels and rear bumper of the car when working in the trunk. The cover 8 may be used to protect the door of the car when working in that area. The cover 8 may be used to protect the outside wall of a pick-up truck. In these applications, often there is only a narrow flat surface on which to rest the cover 8. There may be no lip on which to catch the top of a cover, no metal portions on which to use magnets, and no catches to attach hooks or other fasteners that will not be damaged thereby. In these applications, the present invention may be used to protect the various surfaces. All that is necessary to use the present cover 8 is a narrow surface or an equivalent combination of braces, parts and surfaces on which to rest the weighted portion 16.

The principles, a preferred embodiment and the mode of operation of the present invention have been described in the foregoing specification. However, the invention which is intended to be protected is not to be construed as limited to the particular embodiment disclosed. The embodiment is therefore to be regarded as illustrative rather than restrictive. Variations and changes may be made by others without departing from the spirit of the present invention. Accordingly, it is expressly intended that all such equivalents, variations and changes which fall within the spirit and scope of the present invention as defined in the claims be embraced thereby.

What I claim is:

1. An automobile work cover, comprising:
   a body comprised of a sheet of material having a substantially straight upper edge; and
   non-magnetic weight means attached to said substantially straight upper edge, the total weight of said non-magnetic weight means being sufficient to retain said cover in position on an automobile, wherein said non-magnetic weight means includes:
   a loop formed in said upper edge of said body;
   padding material; and
   a plurality of non-magnetic weights wrapped in said padding material within said loop.

2. A fender cover, comprising:

a body comprised of a sheet of material having a tough, fluid-resistant outer surface, a non-scratching inner surface and a substantially straight upper edge, said body being sized to cover a sufficient amount of an automobile fender to protect said fender from being scratched during under-hood repair;

a loop in said upper edge of said body wherein said upper edge is folded back and attached to said inner surface;

a flexible padding material; and a plurality of non-magnetic weights wrapped in said padding material within said loop, the total weight of said non-magnetic weights being sufficient to retain said cover in place on an automobile fender.

3. A fender cover, comprising:

a body having laterally displaced upper and lower edges and laterally displaced first and second side edges, said upper edge being substantially straight, and said body being comprised of a thin material having a tough, fluid-resistant outer surface, a soft, non-scratching inner surface, and being sized to cover a sufficient amount of an automobile fender to protect said fender from being scratched during under-hood repair; and a flexible non-magnetic weighted portion attached along said upper edge of said body between said first and second side edges, said weighted portion being sufficiently heavy to retain said cover in place on an automobile fender, and wherein said weighted portion includes:

a flexible padding material;

a plurality of non-magnetic weights wrapped in said padding material; and a loop formed along said upper edge wherein said upper edge is folded over and around said non-magnetic weights wrapped in said padding material and attached to said inner surface.

* * * * *